US011100555B1

(12) United States Patent
Williams et al.

(10) Patent No.: US 11,100,555 B1
(45) Date of Patent: Aug. 24, 2021

(54) ANTICIPATORY AND RESPONSIVE FEDERATED DATABASE SEARCH

(71) Applicant: Coupa Software Incorporated, San Mateo, CA (US)

(72) Inventors: Andrew Williams, Münchenstein (CH); Udo Gruenhoff, Muttenz (CH)

(73) Assignee: Coupa Software Incorporated, San Mateo, CA (US)

( * ) Notice: Subject to any disclaimer, the term of this patent is extended or adjusted under 35 U.S.C. 154(b) by 172 days.

(21) Appl. No.: 15/972,060

(22) Filed: May 4, 2018

(51) Int. Cl.
*G06Q 30/06* (2012.01)
*G06Q 30/02* (2012.01)
*G06F 16/9535* (2019.01)

(52) U.S. Cl.
CPC ..... *G06Q 30/0625* (2013.01); *G06F 16/9535* (2019.01); *G06Q 30/0283* (2013.01)

(58) Field of Classification Search
CPC ............ G06Q 30/0625; G06Q 30/0283; G06F 16/9535
USPC ...................................................... 705/26.62
See application file for complete search history.

(56) References Cited

U.S. PATENT DOCUMENTS

| | | | | |
|---|---|---|---|---|
| 3,057,040 A * | 10/1962 | Cuculo | ..................... | D01F 1/10 428/401 |
| 7,389,307 B2 * | 6/2008 | Golding | ................ | G06F 16/951 707/694 |
| 7,725,875 B2 * | 5/2010 | Waldrep | ................ | G06F 16/954 717/106 |
| 8,131,718 B2 * | 3/2012 | Tran | ..................... | G06F 16/9535 707/732 |
| 8,195,655 B2 * | 6/2012 | Agrawal | ............... | G06F 16/951 707/730 |
| 8,234,266 B2 * | 7/2012 | Strohm | ................. | G06F 16/951 707/709 |

(Continued)

FOREIGN PATENT DOCUMENTS

WO    WO-2013003674 A1 *  1/2013  ............. G06Q 30/02

OTHER PUBLICATIONS

Guerriero, A. et al, A dynamic URL assignment method for parallel web crawler, 2010, IEEE (Year: 2010).*

(Continued)

*Primary Examiner* — Marissa Thein
*Assistant Examiner* — Thomas Joseph Sullivan
(74) *Attorney, Agent, or Firm* — Baker Botts L.L.P.

(57) ABSTRACT

A computer-implemented method of performing product data searches is disclosed. The method comprises identifying a list of search terms for one of a plurality of supplier systems; determining a search schedule for the one supplier system; performing a first search of product data hosted by the one supplier system using the list of search terms according to the search schedule, comprising: simulating, upon receiving product data returned by the one supplier system, a user interaction with a graphical user interface that triggers generation of additional product data by the one supplier system, and retrieving dynamic data generated in response to the triggering; storing a result of the first search in a memory coupled with the processor; receiving a search query from a buyer system; identifying one or more matches of the search query from the result of the first search in the memory.

19 Claims, 6 Drawing Sheets

(56) References Cited

U.S. PATENT DOCUMENTS

| | | | | |
|---|---|---|---|---|
| 8,630,994 | B2* | 1/2014 | Greene | G06F 16/168 |
| | | | | 707/706 |
| 9,082,126 | B2* | 7/2015 | Nielsen | G06Q 30/0277 |
| 9,922,327 | B2* | 3/2018 | Johnson | G06Q 30/06 |
| 10,929,415 | B1* | 2/2021 | Shcherbakov | G06F 16/26 |
| 2007/0179858 | A1* | 8/2007 | Jennings | G06Q 30/0627 |
| | | | | 705/51 |
| 2008/0004992 | A1* | 1/2008 | King | G06Q 30/06 |
| | | | | 705/26.62 |
| 2009/0210412 | A1* | 8/2009 | Oliver | G06F 7/02 |
| 2010/0318538 | A1* | 12/2010 | Wyman | G06F 16/3349 |
| | | | | 707/759 |
| 2011/0047120 | A1* | 2/2011 | Kamvar | G06F 16/3325 |
| | | | | 706/50 |
| 2011/0238533 | A1* | 9/2011 | Shadchnev | G06Q 30/06 |
| | | | | 705/27.1 |
| 2012/0310914 | A1* | 12/2012 | Khan | G06F 16/951 |
| | | | | 707/710 |
| 2013/0066848 | A1* | 3/2013 | Tuttle | G06F 16/951 |
| | | | | 707/711 |
| 2015/0058307 | A1* | 2/2015 | Leandri | G06F 16/9535 |
| | | | | 707/706 |
| 2015/0220963 | A1* | 8/2015 | Priebatsch | G06Q 30/0268 |
| | | | | 705/14.38 |
| 2016/0188696 | A1* | 6/2016 | Belghiti | G06F 16/2272 |
| | | | | 707/718 |
| 2016/0246841 | A1* | 8/2016 | Pesala | G06F 16/9535 |
| 2017/0316321 | A1* | 11/2017 | Whitney | H04L 67/2847 |
| 2019/0205649 | A1* | 7/2019 | Ananthanarayanan | |
| | | | | G06K 9/6256 |
| 2019/0278870 | A1* | 9/2019 | Novielli | G06F 16/9574 |

OTHER PUBLICATIONS

Wu, Min, et al, The Research and Implementation of parallel web crawler in cluster, 2010, International Conference on Computational and Information Sciences (Year: 2010).*

Sharma, Shruti, et al, A Novel Architecture of a Parallel Web Crawler, Jan. 2011, International Journal of Computer Applications (0975-8887) vol. 14—No. 4 (Year: 2011).*

Han, Shuguang, et al, Predictive Crawling for Commercial Web Content, 2019, IW3C2 (International World Wide Web Conference Committee) (Year: 2019).*

Mathur et al, Dark Patterns at Scale: Findings from a Crawl of 11K Shopping Websites, Sep. 20, 2019, Proc. ACM Hum.-Comput. Interact., vol. 3, No. CSCW, Article 81 (Year: 2019).*

* cited by examiner

ANTICIPATORY AND RESPONSIVE FEDERATED DATABASE SEARCH

FIELD OF THE DISCLOSURE

One technical field of the present disclosure is computer-implemented database search systems. Another technical field is interactive systems for the display of search results that are programmed to interoperate with federated databases and interoperate with multiple different digital catalogs. Yet another technical field is federated search of digital catalog data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Large-scale procurement of products and services by business enterprises now typically involves computer-implemented procurement systems that can accept creation of requisitions and purchase orders, assist with digitized online searching of catalog data, submit orders to vendors and process invoices. A typical procurement system associated with a buyer computer allows submission of a search query for items to purchase and causes display of a search result regarding all the items that satisfy the search query. For example, the search query can be received from a web browser, and submitted to multiple different online catalogs of different vendors. The search results also can be displayed by the web browser as one or more webpages. The search query could be for wireless routers, and the search result may include a name, a description, and a price of each wireless router covered in the search database. The search result can come from static catalogs that are not regularly updated, or product data dynamically gathered from supplier systems in response to receiving the search query.

The static catalogs may not be current or comprehensive. In addition, the dynamic collection of product data from each supplier system takes time, and the most time-consuming collection among all the supplier systems becomes a bottleneck. It would be helpful to be able to reduce the time it takes to respond to a search query without sacrificing the quality of the search result.

DETAILED DESCRIPTION

Figure 1:
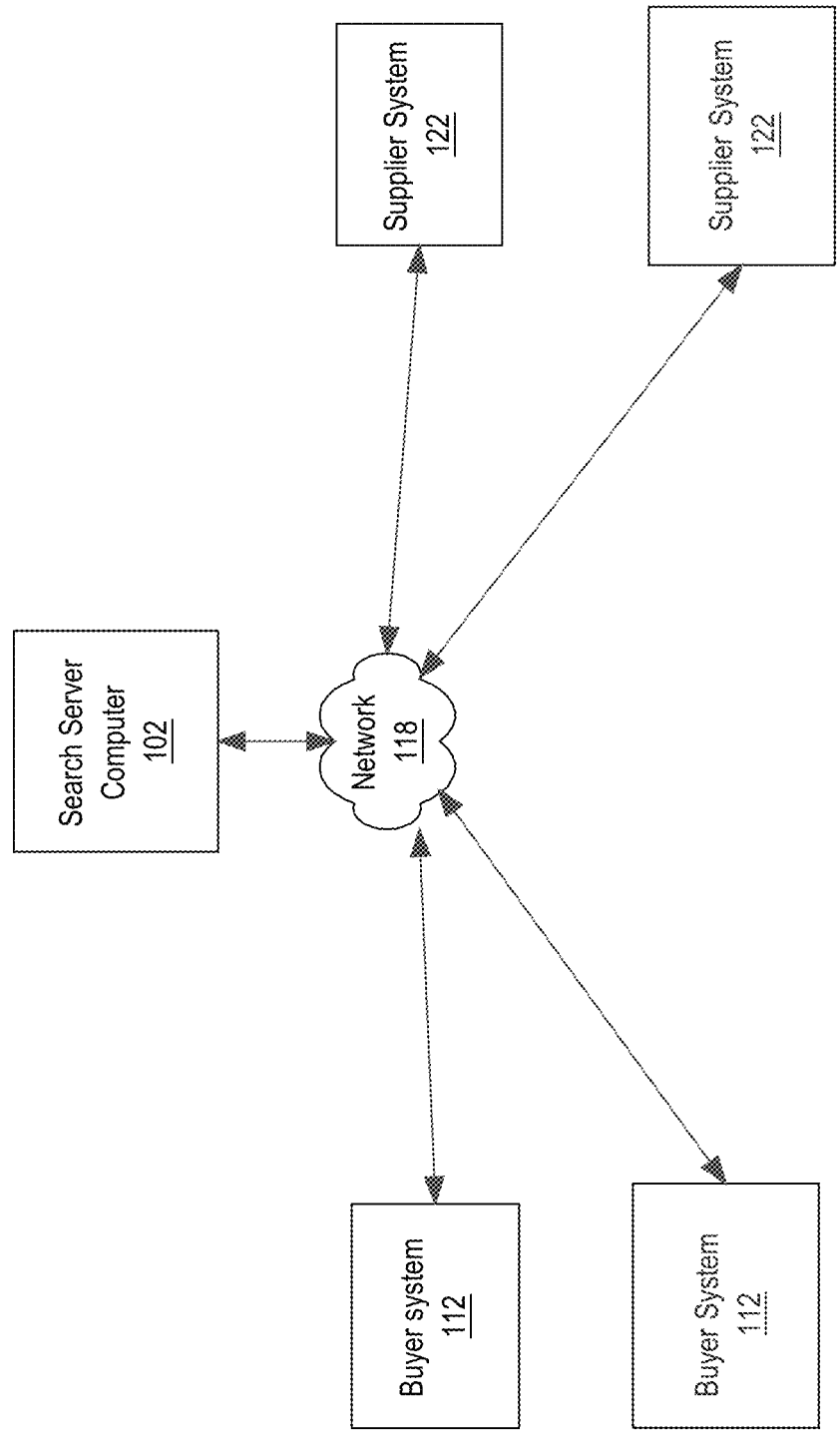
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS
3. EXAMPLE COMPUTER COMPONENTS
4. FUNCTIONAL DESCRIPTION
   4.1. COLLECTING DATA FROM BUYER SYSTEMS
   4.2. INTERFACING WITH SUPPLIER SYSTEMS
   4.3. PERFORMING PREDICTIVE SEARCHES
   4.4. HANDLING SEARCH QUERIES FROM BUYER SYSTEMS
5. EXAMPLE PROCESSES
6. IMPLEMENTATION EXAMPLE—HARDWARE OVERVIEW
7. EXTENSIONS AND ALTERNATIVES

1 General Overview

A federated database search system and related methods that are programmed to anticipate search queries and respond to the anticipated search queries are disclosed. In some embodiments, the search system is programmed or configured with data structures and/or database records that are arranged to search product data provided by a plurality of supplier systems for matches of search queries from buyer systems to maximize the quality of the search result while minimizing the response time to the search queries.

In some embodiments, the search system is programmed to perform predictive searches that predict what the search queries might be and prefetch the corresponding search results. More specifically, the search system is programmed to identify search terms based on which the predictive searches are performed. As different supplier systems might offer different types of product data and different types of search interfaces, a distinct set of search terms can be identified for each supplier system. For example, for a supplier system associated with a supplier of computer equipment and operating an e-commerce website that displays a list of search criteria for wireless routers on a webpage, the set of search terms can include those search criteria.

The search system is also programmed to determine a search schedule of search times at which the predictive searches are performed. As different supplier systems might operate under different schedules or offer different types of data having different life cycles, a distinct search schedule can also be determined for each supplier system. For example, for a supplier system that is typically busy during normal business hours in Europe and performs monthly data refreshes, the search schedule can require a predictive search to be performed during afterhours in Europe and at least every month. For each supplier system, the search system is programmed to then perform predictive searches using the corresponding set of search terms according to the corresponding search schedule so that search result is available in a local memory or database in advance of receiving a search query from a buyer system.

In each predictive search, upon receiving product data returned by the supplier system in response to the search terms, the search system is programmed to simulate a user action that triggers generation of additional product data by the supplier system. For example, an item can be placed in a shopping cart to reveal the actual price of the item. The server is programmed then to collect from the supplier system existing product data as well as dynamically generated product data.

In some embodiments, a buyer system, which might have received a query from an associated acquisition system or a buyer, is programmed to send a search query to the search system. For example, the search query can refer to a wireless router having a speed higher than 20 MBps or a price less than $50. The search system is programmed to then identify matches of the search query directly from the local memory, which contains results of previous predictive searches and reactive searches, and return a search result related to these matches to the buyer system. When an updated search result is desired, the buyer system can be programmed to send an implicit or explicit query for updating the search result. In response to the query, the search system is programmed to then perform reactive searches of product data hosted by the supplier systems using the search query or additional information included in the query, in a similar manner as a predictive search. The matches of the search query found during the reactive searches can then be returned to the buyer system.

The search system produces many technical benefits. Overall, the search system allows a buyer system to submit a search query, receive relevant matches from product data provided by several supplier systems, and purchase the items corresponding to the matches without having to directly communicate with any supplier system. Therefore, the search system enables a streamlined product acquisition process for a buyer system or the associated buyer. In terms of performance, the search system produces a search result in response to a search query from a buyer system without any delay from retrieving product data from one or more supplier systems. Furthermore, when a predictive search is performed without being subject to any service level constraint, the predictive search can include various details of static product data and additional product data through dynamic generation. Predictive searches are also performed repeatedly to ensure that the product data is continuously up-to-date. Therefore, the search system also produces a search result of a high quality, with rich multimedia content and various details. In addition, the search system allows a supplier system to make their product data accessible to many buyer systems that might prefer dealing with a single system, without incurring excessive operational overhead.

The present disclosure explains embodiments and implementations of apparatus, systems, software and data processing methods that are capable of working. However, embodiments or implementations described herein do not necessarily derive from, describe or correspond to any particular commercial product or service that may be associated with or offered by the inventors, their assignee or the applicant company.

2 Example Computing Environments

FIG. 1 illustrates an example networked computer system with which various embodiments may be practiced. FIG. 1 is shown in simplified, schematic format for purposes of illustrating a clear example and other embodiments may include more, fewer, or different elements.

In some embodiments, the networked computer system comprises a search server computer 102 ("server"), one or more supplier systems 122 and one or more buyer systems 112, which are communicatively coupled directly or indirectly via one or more networks 118.

In some embodiments, the server 102 broadly represents one or more computers, virtual computing instances, and/or instances of a server-based application that is programmed or configured to host or execute functions including but not limited to performing predictive searches for buyer systems 112 of product data provided by supplier systems 122. Product data can cover any attribute of a product, such as a name, description, a picture, a review, or a price. The server 102 can be programmed to further manage product data collected from supplier systems 122 in one or more local memories or provide an interface for handling search queries for specific products from buyer systems, or communicate with an acquisition system that implements these features. The server 102 can comprise a server farm, a cloud computing platform, a parallel computer, or any other computing facility with sufficient computing power in data processing, data storage, and network communication for the above-described functions.

In some embodiments, a supplier system 122 is programmed to manage product data, such as digital catalogs of products sold by the supplier associated with the supplier system, and support online sales transactions. The supplier system 122 can be programmed to provide specific application programming interfaces ("APIs") or graphical user interfaces ("GUIs") for accessing the product data or otherwise communicating with the supplier system 122. For example, a supplier system 122 can implement a website that displays product information on webpages. The supplier system 122 may similarly comprise computing facility with sufficient computing power in data processing, data storage, and network communication for the above-described functions.

In some embodiments, a buyer system 112 including an acquisition system is programmed to manage one or more buyer accounts and support online purchase transactions. The buyer system 112 can be programmed to present GUIs for accessing product data and generally conducting purchase transactions. The buyer system 112 may similarly comprise computing facility with sufficient computing power in data processing, data storage, and network communication for the above-described functions. In certain embodiments, the buyer system 112 may be integrated with the server 102. In other embodiments, the buyer system 112 may be decoupled from the acquisition system and mainly represents a buyer. In that case, the buyer system 112 can comprise a desktop computer, laptop computer, tablet computer, smartphone, wearable device, etc.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to communicate with each supplier system 122 to obtain supplier preferences or configurations, such as how often the product data is updated. The server 102 is programmed to further collect product data from each supplier system 122 using specific search terms and under specific search schedules in accordance with the supplier configurations. The buyer system 112 is programmed to subsequently send a search query to the server 102. In response to the search query, the server 102 is programmed to then find matches of the search query in the product data collected form the supplier systems 122 prior to receiving the search query and transmit a search result related to the matches to the buyer system 112. The buyer system 112 may be configured to send a follow-up query to the server 102 to expand or improve the search. The server 102 is programmed to then retrieve product data from the supplier systems 122 based on the follow-up query and transmit an updated search result containing at least some of the newly retrieved product data to the buyer system 112.

3. Example Computer Components

Figure 2:
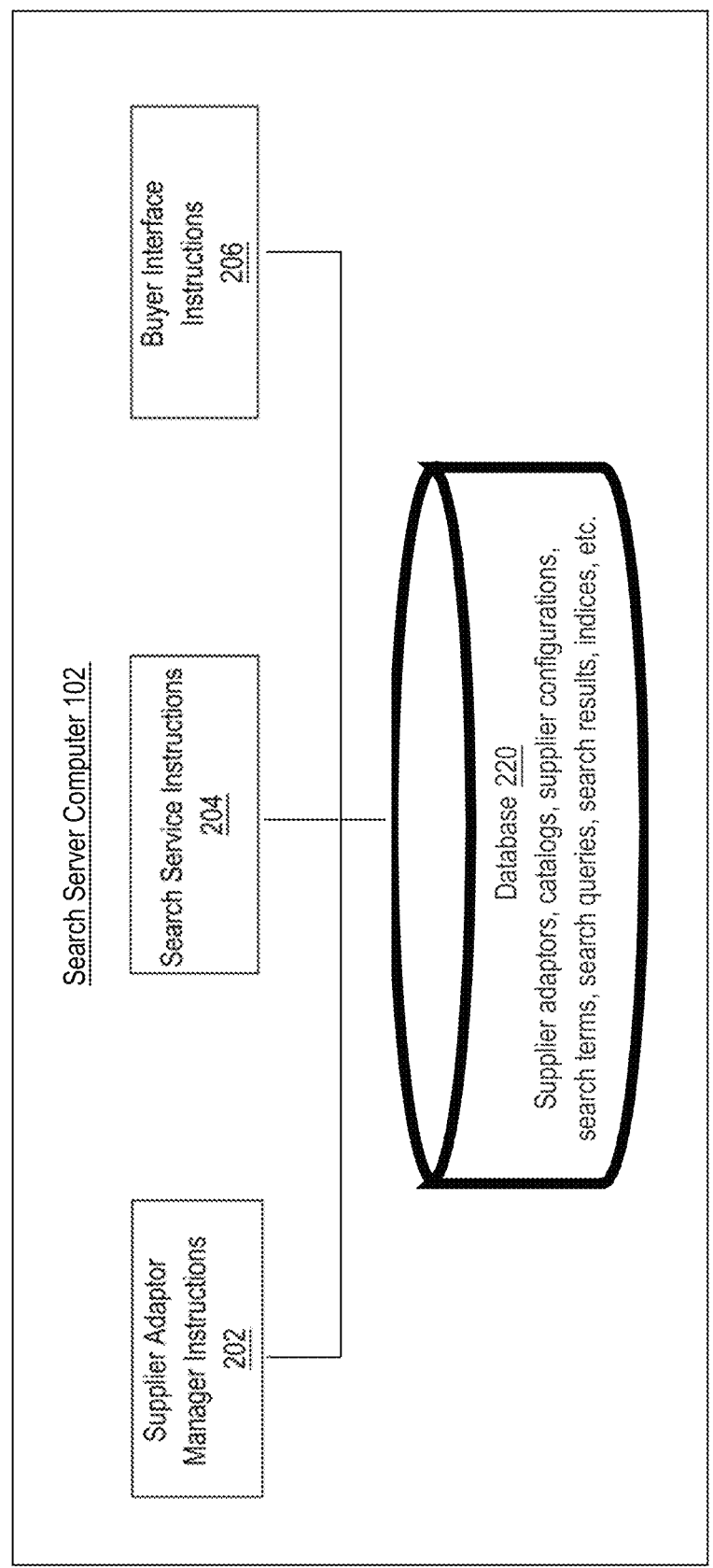
FIG. 2 illustrates example components of the search server computer in accordance with the disclosed embodiments.

FIG. 2 illustrates example components of the search server computer in accordance with the disclosed embodiments. FIG. 2 is provided to illustrate one clear example, and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise a supplier adaptor manager 202, a search service 204, and a buyer interface 206. In addition, the server 102 can comprise a database module 220.

In some embodiments, the supplier adaptor manager 202 is programmed or configured to manage adaptors corresponding to supplier systems 122. Each adaptor comprises a computer program with one or more computer-executable instructions. Each adaptor for a supplier system 122 enables access to the product data hosted by the supplier system 122 as well as processing and storage of the product data collected from the supplier system 122.

The supplier adaptor manager 202 is programmed to also maintain a list of supplier systems for which adaptors are managed. The list can change depending on availability of supplier systems 122, preferences of buyer systems 112, or computing requirements of the server 102. The supplier adaptor manager 202 is programmed to further manage configuration data associated with each supplier system 122, such as the estimated workload, maintenance schedule, or communication bandwidth.

In some embodiments, the search service 204 is programmed or configured to collect product data from supplier systems 122 using the corresponding adaptors based on specific search terms and according to a specific search schedule. The search service 204 is programmed to also process and store the collected product data. For each supplier system 122, the server service 204 is programmed to maintain the search terms based on domain knowledge or search histories of the buyer systems 112.

The search service 204 is programmed to also maintain the search schedule based on configuration data for the supplier systems 122. Furthermore, the search service 204 is programmed to find matches of a search query from the product data collected according to the specific schedule. The search service 204 is programmed to also collect further product data using the adaptors from supplier systems 122 in response to a search query and find further matches of the search query from the newly collected product data.

In some embodiments, the buyer interface 206 is programmed or configured to receive search queries from the buyer systems 112 and return search results based on the search queries to the buyer systems 112. The buyer interface 206 is programmed to further manage preferences associated with each buyer systems 112, such as the types of information to be included in the product data for review, the types of suppliers and associated supplier systems from which product data is to be collected, or the types of search terms representing typical product data of interest.

In some embodiments, the database 220 is programmed or configured to manage relevant data structures and store relevant data for functions performed by the server 102. The data may be related to supplier adaptors, catalogs, supplier configurations, buyer preferences, search terms, search queries, search results, or indices.

4 Functional Description

4.1 Collecting Data from Buyer Systems

In some embodiments, the server 102 is programmed to collect preference data from each buyer system. The preference data can indicate any preferences or requirements associated with the buyer system, such as the types or arrangement of data to be included in the product data for review, the list or types of suppliers or associated supplier systems from which product data is to be collected, or the typical search terms representing the product data of interest. These search terms provided by the buyer systems can be used in predictive searches, as further discussed below. The server 102 can store the collected preference data in one or more memories. For example, the preference data may indicate that product data should be collected from supplier systems in the consumer electronics industry, the product data for review should include a name, a description, a technical specification, and a price, and the search terms include "television", "refrigerator", or other words corresponding to consumer electronics.

4.2 Interfacing with Supplier Systems

In some embodiments, the server 102 is programmed to manage a list of suppliers and their associated supplier systems. The server 102 can be programmed to start with an internal list of supplier systems for each of one or more industries. The list can then be adjusted based on the preference data for the buyer systems or the configuration data for the supplier systems 122, as further discussed below.

In some embodiments, the server 102 is programmed to collect configuration data from a supplier system 122. The configuration data may indicate any configurations related to the supplier system, such the infrastructure or operation of the supplier system or the product data associated with the supplier system. For example, the configuration data may indicate an aggregate measure of how much bandwidth the supplier system has during different hours of a day or how often the supplier system updates the product data.

The timing of the refresh or update can be expressed as a frequency, a period, or specific times, and can be expressed for all the product data collectively or for parts of the product data.

The configuration data can similarly indicate for how long the product data remains valid, which can be helpful when product validity expires before another refresh or update. The configuration data may also indicate how to access the product data hosted by the supplier system, including whether the supplier system provides an API or a GUI, or whether the supplier system has regularly scheduled downtime for maintenance. In addition, the configuration data may include one or more search terms representing the product data associated with the supplier system. These search terms provided by the supplier systems can also be used in predictive searches, as further discussed below.

Figure 3:
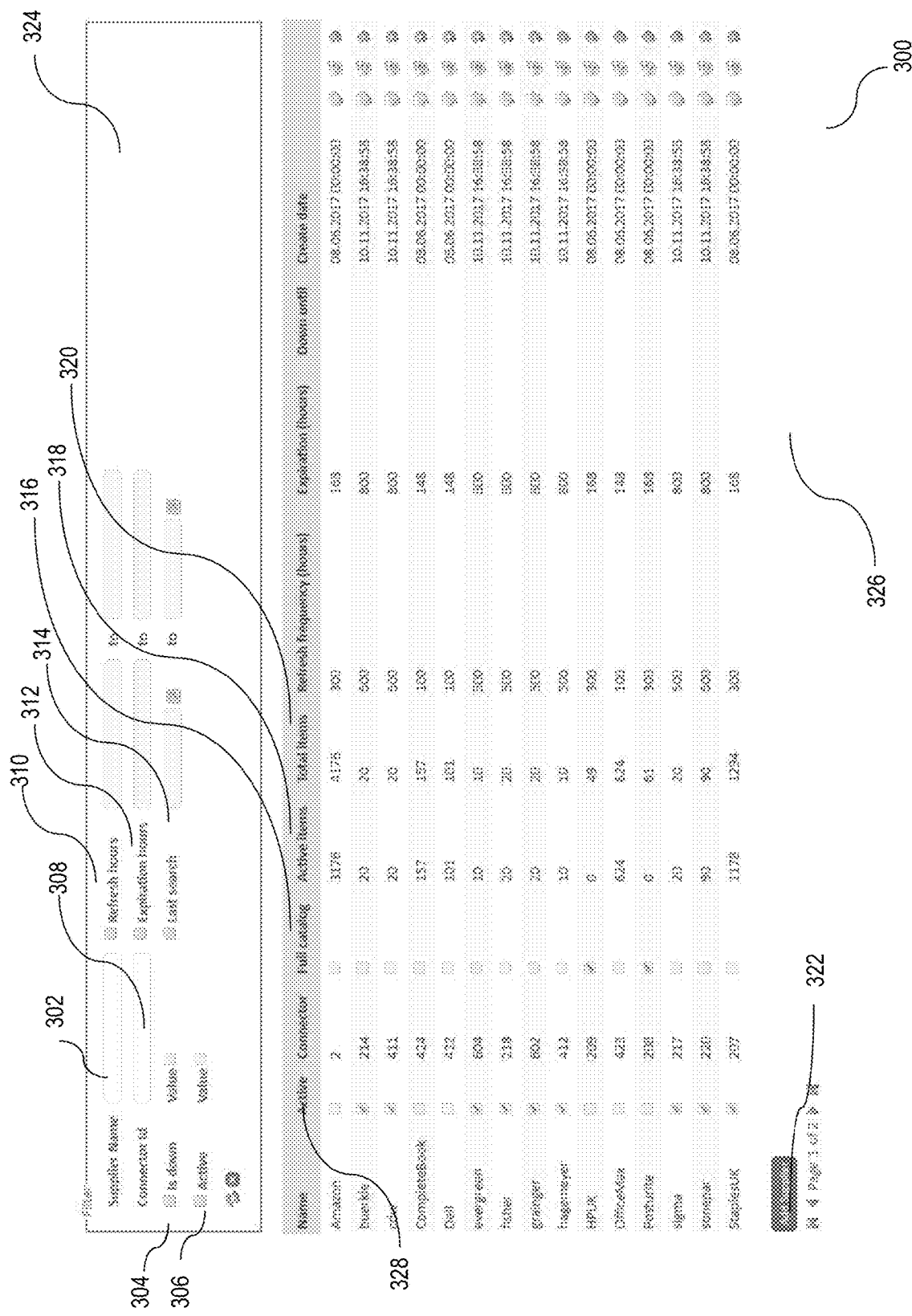
FIG. 3 illustrates an example screen display of a graphical user interface related to configuration data for supplier systems.

The server 102 can be programmed to cause presentation of a GUI related to configuration data. FIG. 3 illustrates an example screen of a graphical user interface related to configuration data for supplier systems.

In some embodiments, the screen 300 includes an upper portion 324 for entering filter criteria applicable to configuration data for a supplier system and a lower portion 326 for reviewing and updating configuration data for a list of supplier systems that satisfy the filter criteria. The upper portion 324 includes a field 302 for entering at least part of the name of the supplier associated with the supplier system and a field 308 for entering a connector ID that may identify a corresponding adaptor. The upper portion 324 includes one or more fields 310 for indicating whether a range for a refresh period is given specifying how often a supplier system refreshes the associated product data and what the minimum and maximum refresh periods are, such as 240 and 480 hours or 10 and 20 days.

The upper portion 324 includes one or more fields 312 for indicating whether a range for an expiration period is given specifying when the product data expires after which the product data is no longer valid even if it might still be accessible and what the minimum and maximum expiration periods (e.g., length of time from now) are. The expiration period is normally longer than the refresh period. The upper portion 324 includes one or more fields 314 for indicating whether a range for a time of last searching the product data is given and what the earliest and latest times are, such 2 pm and 3 pm on Jun. 30, 2017.

In addition, the upper portion 324 includes one or more fields 304 for indicating whether a system-down criterion is given and what the criterion for determining whether the supplier system is down is, such as no response 10 seconds after a ping. The upper portion 324 also includes one or more fields 306 for indicating whether a system-active criterion is given and what the criterion for determining whether the supplier system is active is. A supplier system can be inactive even if it is not down when the supplier system no longer performs any operation, including updating the product data, other than staying alive.

In some embodiments, in response to receiving any part of the filter criteria, the lower portion 326 shows the configuration data in each line for each supplier system that satisfies the filter criteria. The fields presented by the lower portion 326 generally corresponds to the fields presented by the upper portion 324. Through the field 328, the lower portion 326 may show the current active status of a supplier system by default but also allow a change of the active status. For each supplier system, the lower portion 326 shows the number of active items 318 that have been collected from the supplier system and stored in a local memory and have not yet expired, with each item typically corresponding to an item in a product catalog. The lower portion 326 also shows the total number of items 320 that have been collected from the supplier system and stored in a local memory.

Through the option 316, the lower portion 326 may show the full-catalog status of a supplier system by default but also allow a change of the full-catalog status, which indicates whether the entire product data or the full catalog hosted by the supplier system is to be collected. For example, collecting the full catalog might make sense when the total size of the product data is small. The lower portion 326 can also include an option to specify a criterion for searching a partial dialog. For example, it might be known that the product data associated with a supplier system is hosted in multiple databases or covered by multiple other catalogs, and the criterion can specify one of the databases or one of the catalogs. In addition, the lower portion 326 includes an option 322 for adding configuration data for a supplier system. The selection of this option may bring up a new screen for entering configuration data for the supplier system.

Figure 4:
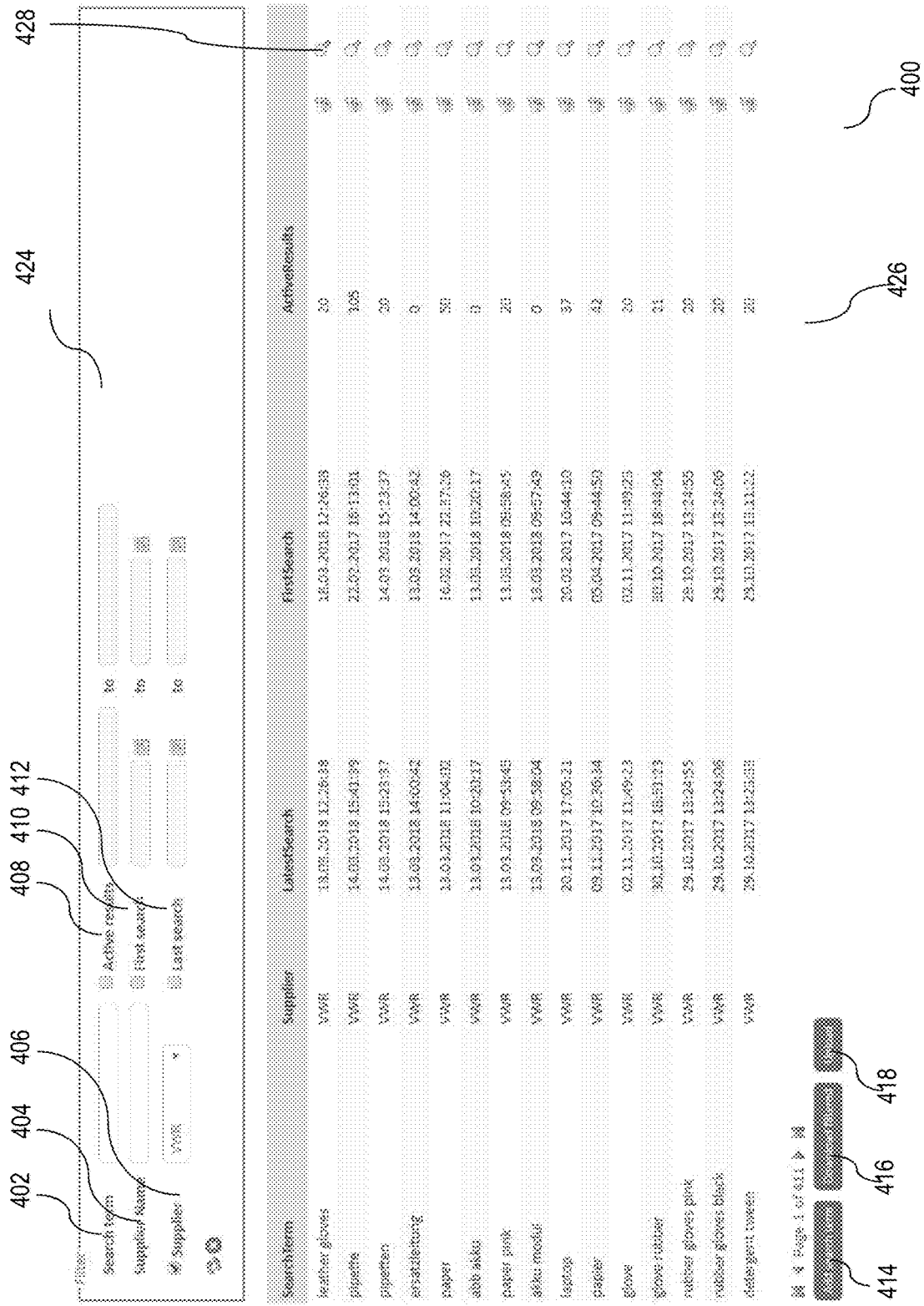
FIG. 4 illustrates an example screen display of a graphical user interface related to search term data.

The server 102 can be programmed to cause presentation of a graphical user interface related to search term data. FIG. 4 illustrates an example screen of a graphical user interface related to search term data. This data entered into or displayed in this screen can apply to one or more buyer systems.

In some embodiments, the screen 400 includes an upper portion 424 for entering filter criteria applicable to search term data and a lower portion 426 for reviewing and updating search term data for a list of search terms that satisfy the filter criteria. The upper portion 424 includes a field 402 for entering a search term. The search term can comprise one or more words or phrases. The upper portion 424 includes a field 404 for entering at least part of the name of a supplier or associated supplier system. The upper portion 424 includes one or more fields 406 for indicating whether the supplier is associated with one of the list of (existing) supplier systems and the identity of that supplier. The upper portion 424 also includes one or more fields 408 for indicating whether a range of the number of active results associated with the supplier system is given and what the minimum and maximum number of active results in the local storage are, such as 500 and 1,000. An active result of a search term typically refers to the number of active (valid, non-expired) items that match the search term. In addition, the upper portion 424 includes one or more fields 410 for indicating whether a range for a time is given of first searching product data associated with one or more supplier systems using this search term and what the earliest and latest times are, such 2 pm and 3 pm on Jun. 30, 2017. Similarly, the upper portion 424 includes one or more fields 412 for indicating whether a range for a time is given of last searching product data associated with one or more supplier systems using the search term and what the earliest and latest times are.

In some embodiments, the lower portion 426 shows certain search term data in each line for each search term that satisfies the filter criteria. The fields presented by the lower portion 426 generally corresponds to the fields presented by the upper portion 424. The lower portion 426 includes an option 414 for adding search term data for a search term. The selection of this option may bring up a new screen for entering search term data for the search term. The lower portion 426 also includes an option 416 for downloading the search term data for search terms that satisfy the filter criteria. The lower portion 426 further includes a similar option 418 for uploading specific search term data. In addition, the lower portion 426 includes an option 428 for each listed search term for performing a reactive search using the search term of the product data of the associated supplier system. The selection of this option can bring up another screen that displays the search result.

In some embodiments, the server 102 is programmed to manage a list of custom adaptors corresponding to the list of supplier systems. When an API is available for accessing product data associated with the supplier system, an adaptor corresponding to the supplier system can be configured for communicating with the supplier system through that API. When a GUI for accessing product data is available, an adaptor can be configured for communicating with the supplier system by navigating the GUI and otherwise simulating user interactions with the GUI. In general, each adaptor for a corresponding supplier system is customized to be able to access product data associated with the supplier system at the item level or item attribute level.

In some embodiments, in simulating user interactions with the GUI, the server 102 is programmed to collect not only product data readily generated by the supplier system, such product information on a webpage automatically presented by the supplier system, but also product data generated dynamically in response to specific user interactions, such as initiating an online transaction. For example, the supplier system may initially present a webpage showing the name and a description of a product. The webpage may also include a statement that effectively states that the price of the product will be revealed after the product is placed in the shopping cart, to encourage adding items to the shopping cart or simply to hide pricing information from simple web crawlers.

The adaptor is configured for then placing the product in a shopping cart and retrieving the dynamically generated pricing information from the shopping cart. Similarly, the server 102 is programmed to collect not only basic product data but also complex product data, which increases the quality of the product data presented to the buyer systems. For example, an adaptor can be configured for retrieving and saving not only a name or a textual description but also a photograph or a video review of a product. Such data collection does not sacrifice the speed of preparing the product data for presentation to the buyer system when the data collection is performed as part of the predictive search, as further discussed below.

In some embodiments, the server 102 is programmed to improve the transmission of product data from the supplier system to one or more local memories. The server 102 is programmed to create or receive certain filter criteria that describe the product data that is already available in local storage or otherwise does not need to be retransmitted. Therefore, in addition to matching product data for each item with specific search criteria that describe the product data to be transmitted, an adaptor for a supplier system can be configured to also match the product data for each item with the filter criteria to reduce the transmission volume. For example, the adaptor may be configured for skipping transmitting an item from a supplier system back to the local storage when the item has an associated expiration date that is at or before the current time.

Similarly, the adaptor may be configured for skipping transmitting an item from the supplier system back to the local storage when the item has an expiration date that is in the future or at least some time into the future and a creation date that is before the last collection of the product data from the supplier system.

In some embodiments, the server 102 is programmed to monitor the availability and accuracy of the adaptors. The validity of each adaptor can be violated when the corresponding supplier system is down or defunct or when the adaptor can no longer access the product data associated with the supplier system. The latter can occur when the credentials for accessing the product data have changed, when the computing infrastructure of the supplier system has been updated, etc. The server 102 can thus be configured to schedule routine searches by invoking each adaptor with a constant or simple search criterion to detect and remediate any invalid conditions. The monitoring result can also be used to update the list of supplier systems, as discussed above.

4.3 Performing Predictive Searches

In some embodiments, the server 102 is programmed to perform predictive searches using the search terms. Such searches are predictive because they are performed based on the search terms in advance of receiving search queries from the buyer systems. More specifically, the server 102 is programmed to search the product data associated with each of the list of supplier systems using a corresponding adaptor according to a corresponding search schedule. For each supplier system, the scheduling takes into consideration certain configuration data for the supplier system. For example, each period between predictive searches can be slightly less than the refresh period or the expiration period to help ensure the validity of the collected product data without excessively burdening the supplier system.

The predictive searches can also be scheduled to avoid times of heavy workload or routine maintenance of the supplier system. In addition, as each predictive search can typically be divided into individual parallel searches respectively corresponding to individual search terms, the server 102 is programmed to evaluate the number and nature of the search terms and determine how to execute the parallel searches. Such determination reduces the chance of overburdening the supplier system or being classified as a malicious host by the supplier system.

The scheduling may be limited to no more than a certain number of searches in parallel. In addition, the search terms can be clustered using similarity metrics or clustering techniques known to someone skilled in the art. The scheduling can then avoid searches based on similar search terms in parallel or within a certain amount of time of one another.

In some embodiments, the server 102 is programmed to index the product data collected by an adaptor before returning any search result based on that product data back to a buyer system. The product data collected based on the search terms can describe different attributes of a product that are not covered by the search terms. For example, the search terms might correspond to "a screwdriver with a removable bar", and the product data collected from the supplier system may include data related to screwdrivers that each have a removable bar and are suitable for high torque applications.

All such attributes included in the collected product data can be included in the indexing procedure before or after the collected data is stored in one or more memories or local databases. Such indexing at or near the time the product data is collected or stored maximizes the number of buyer systems that subsequently submit search queries. Similar indexing can be performed following a reactive search, as further discussed below.

In some embodiments, the server 102 is programmed to process the product data obtained from the predictive search. The processing may include comparing the current prices of the items included in the product data with the previous prices. An alert of a price drop can then be sent to one or more buyer systems. The processing may also include identifying any item described by the product data that is newly released by a supplier or new to the market, or any item that is on a waitlist of a buyer system. An alert can then also be sent to one or more buyer system. Similar processing can be performed following a reactive search, as further discussed below.

4.4 Handling Search Queries from Buyer Systems

In some embodiments, the server 102 is programmed to receive a search query submitted by a buyer system. A search query typically refers to attributes of the products of interest without specifying which product catalogs to search for. The server 102 is programmed to find matches of the search query from the product data already in the one or more memories or local databases, which contain results of predictive searches and previous reactive searches as well as internal catalogs, and return a search result related to the matches. The matching can be performed using any pattern matching or database search techniques known to someone skilled in the art. Without communicating with the list of supplier systems before finding the matches, the search result becomes available much sooner. The server 102 can be programmed to also transmit, with the search result, an option to evaluate the search result or request an updated search result to the buyer system.

In some embodiments, after returning the search result, the server 102 is programmed to receive an indication that the search result is unsatisfactory or a query for updating the search result. In response to the indication or the query, the server 102 is programmed to perform reactive searches of product data hosted by the supplier systems using the adaptors associated with the list of supplier systems based on the search query or additional information included in the indication or query. Without receiving such an indication or query, no reactive search is to be performed. A reactive search is like a predictive search but is performed after receiving a search query from a buyer system and based on the search query. The server 102 can be programmed to find matches of the search query or the additional information after the result of the reactive searches is indexed and stored in the one or more memories or local databases.

In some embodiments, the server 102 is programmed to process the search result before returning anything to the buyer system in response to the search query. The server 102 can be programmed to sort the product data in the search result describing different items based on various criteria, such as the quality of the match with the search terms (when a reactive search is not performed) or the search query, and return the sorted search result to the buyer system.

In some embodiments, the server 102 is programmed to update the search terms associated with the supplier systems with the search query. The search query might include one or more words or phrases that can be used to adjust a list of search terms. In general, when a search query was used to perform a reactive search, there can be a stronger preference for updating the search terms with the search query. The server 102 can be programmed to update the different lists of search terms respectively associated with different supplier system in different manners. For example, the search query or one or more words therein can be aligned or matched with certain attributes of a supplier system to determine how relevant the search query is to the supplier system using any matching or clustering algorithm known to someone skilled in the art.

Any portion of the search query can be added to the list of search terms when the relevance exceeds a certain threshold. How well the product data collected from the supplier system matches the search query can also be used to determine how relevant the search query is to the supplier system. In addition, the server 102 can be programmed to track the search queries at the search query, word, or phrase level. The server 102 can be programmed to then use the search query or a portion thereof to update the search terms when the search query satisfies a certain criterion, such as appearing with a specific frequency for at least one buyer system or across all the buyer systems.

5. Example Processes

Figure 5:
FIG. 5 illustrates an example process performed by the search server computer of performing product data searches.

FIG. 5 illustrates an example process performed by the search server computer of performing product data searches. FIG. 5 is shown in simplified, schematic format for purposes of illustrating a clear example and other embodiments may include more, fewer, or different elements connected in various manners. FIG. 5 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 502, the server 102 is programmed or configured to identify a list of search terms for one of a plurality of supplier systems. The search terms typically include one or more words or phrases and refer to product attributes. The search terms are to be used for predictive searches of the product data hosted by the one supplier system. The search terms can be determined based on domain knowledge, the configuration data for one or more of the plurality of supplier systems, or the preference data for one or more buyer systems.

In step 504, the server 102 is programmed or configured to determine a search schedule for the one supplier system, which determines when to perform predictive searches of the product data hosted by the one supplier system. The search schedule can be determined based mainly on the configuration data for the one supplier system, such as when the product data is refreshed or expires, when the one supplier system has a heavy workload or scheduled maintenance, etc. The search schedule is determined to minimize the number of predictive searches while maximizing the quality of the result of the predictive searches.

In some embodiments, in step 506, the server 102 is programmed or configured to perform a first search of the product data hosted by the one supplier system using the list of search terms according to the search schedule through steps 508 and 510. The predictive search can be performed via an adaptor for the one supplier system. The predictive search can be performed through an API or a GUI provided by the one supplier system.

In step 508, the server 102 is programmed or configured to simulate, upon receiving product data returned by the supplier system in response to the search terms, a user action that triggers generation of additional product data by the one supplier system, and in step 510, the server 102 is programmed or configured to retrieve product data dynamically generated by the one supplier system in response to triggering. For example, the user action can be placing an item in a shopping cart supported by the one supplier system, and the product data dynamically generated by the one supplier system can be a (new) price of the item. The server 102 can be programmed to also collect product data from static catalogs automatically presented by the supplier system. Overall, the collected product data describes items that satisfy the search terms. The server 102 can be programmed to further filter the collected product data before transmitting anything back into a local memory or database. The filtering can remove product data describing expired items or items having low scores from being matched with the search terms. In step 512, the server 102 is programmed or configured to store a final result of the first search in the local memory. The server 102 is also programmed to index the final result of the first search immediately before or after storage into the local memory. The local memory in general stores results of (predictive and reactive) searches of the product data hosted by the plurality of supplier systems and other internal catalogs.

In some embodiments, in step 514, the server 102 is programmed or configured to receive a search query from a buyer system. The search query could comprise one or more words or phrases. In step 516, the server 102 is programmed or configured to identify one or more matches of the search query from the memory without communicating with any supplier system. The matches can be product data previously collected from any of the plurality of supplier systems. The server 102 can be programmed to organize the one or more matches based on the preference data for the buyer system. For example, the preference data might indicate that the product data from certain supplier systems or associated suppliers should be presented first.

In step 518, the server 102 is programmed or configured to transmit a search result related to a final list of matches to the buyer system. The search result can be in the form of a catalog, showing various attribute of each item that satisfies the search query, including the name of the supplier. The search result can be in the form of a shopping cart containing a list of items corresponding to the final list of matches and ready to be processed by a procurement system associated with the buyer system. The server 102 can also be configured to transmit an option to evaluate the final list of items or to query an updated search result. Furthermore, the server 102 is programmed to determine whether to update the search terms associated with the one supplier system with the search query and how to perform such an update. The determination can be based on the relevance of the search query or a portion thereof to the product data associated with the one supplier system, as reflected in the quality of or buyer feedback on the matches of the search query.

In some embodiments, after transmitting the final list of matches to the buyer system, the server 102 is programmed or configured to receive a query to update the previous search result presented to the buyer system. In response to the query, the server 102 is programmed to then perform a reactive search based on the search query or additional information included in the query. The reactive search can otherwise be performed in a similar manner as a predictive search, and the result of the reactive search can be processed and transmitted in a similar manner as the result of a predictive search.

6. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
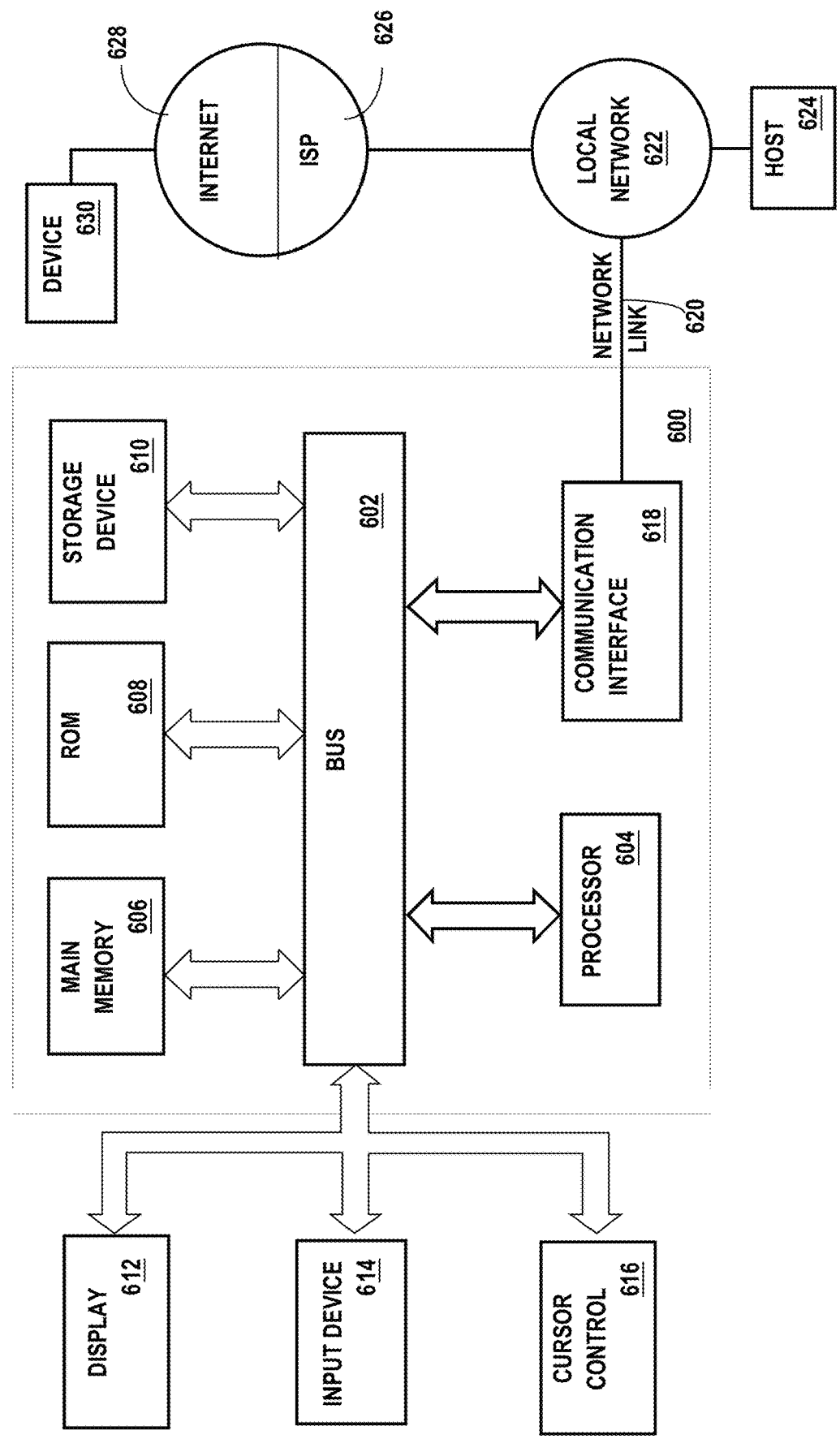
FIG. 6 is a block diagram that illustrates a computer system upon which an embodiment of the invention may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media.

For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of performing product data searches, comprising:
   predictively identifying, by a processor, a list of search terms for one of a plurality of supplier systems, the list of search terms including at least one search term for which a search was not previously performed;
   classifying search terms in the list of search terms into one or more clusters using similarity metrics;
   determining, by the processor, a search schedule for the one supplier system, the search schedule specifying conducting a search when the one supplier system refreshes product data or when the product data expires, the search comprising individual parallel searches respectively corresponding to individual search terms, and the determined search schedule avoiding parallel searches of search terms classified in a single cluster;
   performing a first search of product data hosted by the one supplier system to prefetch a result of the list of search terms according to the search schedule, the first search being performed with the one supplier system that generates data to be rendered in a graphical user interface, comprising:
      programmatically simulating, upon receiving product data returned by the one supplier system in response to the search terms, a user interaction with the graphical user interface that triggers generation of additional product data by the one supplier system, and
      retrieving the additional product data that is generated by the one supplier system in response to the simulating the user interaction;
   storing the result of the first search in a memory coupled with the processor, the memory containing results of one or more prior searches of product data hosted by at least one of the plurality of supplier systems;
   receiving, after the storing, a search query from a buyer system;
   in response to the search query, identifying one or more matches of the search query from at least the result of the first search in the memory without performing another search with a specific supplier system of the plurality of supplier systems that generates data to be rendered in a graphical user interface;
   automatically transmitting search data related to the one or more matches in a form of a shopping cart for an order to the buyer system.

2. The computer-implemented method of claim 1, further comprising:
   receiving, following the automatically transmitting, a request to update the search data from the buyer system;
   performing, in response to the request, a second search of the product data hosted by the one supplier system using the search query;
   storing a result of the second search in the memory.

3. The computer-implemented method of claim 2, further comprising:
   identifying, after storing the result of the second search, at least one match of the search query from the memory;
   transmitting new search data related to the at least one match to the buyer system.

4. The computer-implemented method of claim 1, further comprising
   receiving, from the one supplier system, configuration data indicating configurations related to infrastructure or operation of the one supplier system or the product data associated with the one supplier system,
   the search schedule being determined based on the configuration data.

5. The computer-implemented method of claim 1, the search schedule being determined based on when the one supplier system refreshes the product data or when the product data expires.

6. The computer-implemented method of claim 1, the determining comprising planning parallel searches as part of the first search,
   the parallel searches corresponding to multiple of the list of search terms,
   a number of the parallel searches not exceeding a specific threshold.

7. The computer-implemented method of claim 1, the list of search terms being identified based on domain knowledge, configuration data for one or more of the plurality of supplier systems, or preference data for the buyer system.

8. The computer-implemented method of claim 1, further comprising updating the list of search terms with the search query.

9. The computer-implemented method of claim 8, the updating being based on whether the search query was used to perform a second search of the product data hosted by the one supplier system.

10. The computer-implemented method of claim 1, the first search being performed using an API or a GUI provided by the one supplier system.

11. The computer-implemented method of claim 1, the result of the first search including non-textual data related to an item in addition to a name, a description, or a price of the item.

12. The computer-implemented method of claim 1, further comprising indexing the result of the first search at a time of storing the result of the first search in the memory.

13. The computer-implemented method of claim 1, further comprising
   filtering the one or more matches based on a set of criteria including an expiration date of a match,
   the transmitting being based on a result of the filtering.

14. The computer-implemented method of claim 1, the user interaction that is being simulated including placing an item in a shopping cart supported by the one supplier system, the additional product data including a price of the item.

15. The computer-implemented method of claim 1, the search data including an option for the buyer system to request an updated list of matches to the search query.

16. One or more non-transitory storage media storing instructions which, when executed by one or more computing devices, cause performance of a method of performing product data searches, the method comprising:
predictively identifying, by a processor, a list of search terms for one of a plurality of supplier systems, the list of search terms including at least one search term for which a search was not previously performed;
classifying search terms in the list of search terms into one or more clusters using similarity metrics;
determining a search schedule for the one supplier system, the search schedule specifying conducting a search when the one supplier system refreshes product data or when the product data expires, the search comprising individual parallel searches respectively corresponding to individual search terms, and the determined search schedule avoiding parallel searches of search terms classified in a single cluster;
performing a first search of product data hosted by the one supplier system to prefetch a result of the list of search terms according to the search schedule, the first search being performed with the one supplier system that generates data to be rendered in a graphical user interface, comprising:
    programmatically simulating, upon receiving product data returned by the one supplier system in response to the search terms, a user interaction with the graphical user interface that triggers generation of additional product data by the one supplier system, and
    retrieving the additional product data that is generated by the one supplier system in response to the simulating the user interaction;
storing the result of the first search in a memory coupled with the processor,
    the memory containing results of one or more prior searches of product data hosted by at least one of the plurality of supplier systems;
receiving, after the storing, a search query from a buyer system;
in response to the search query, identifying one or more matches of the search query from at least the result of the first search in the memory without performing another search with a specific supplier system of the plurality of supplier systems that generates data to be rendered in a graphical user interface;
automatically transmitting search data related to the one or more matches in a form of a shopping cart for an order to the buyer system.

17. The one or more non-transitory storage media of claim 16, the method further comprising:
receiving, following the automatically transmitting, a request to update the search data from the buyer system;
performing, in response to the request, a second search of the product data hosted by the one supplier system using the search query;
storing a result of the second search in the memory.

18. The one or more non-transitory storage media of claim 17, the method further comprising:
identifying, after storing the result of the second search, at least one match of the search query from the memory;
transmitting new search data related to the at least one match to the buyer system.

19. A system for performing product data searches, comprising:
one or more processors;
one or more memories storing computer-executable instructions which when executed cause the one or more processors to perform a method, the method comprising:
predictively identifying, by a processor, a list of search terms for one of a plurality of supplier systems, the list of search terms including at least one search term for which a search was not previously performed;
classifying search terms in the list of search terms into one or more clusters using similarity metrics;
determining a search schedule for the one supplier system, the search schedule specifying conducting a search when the one supplier system refreshes product data or when the product data expires, the search comprising individual parallel searches respectively corresponding to individual search terms, and the determined search schedule avoiding parallel searches of search terms classified in a single cluster;
performing a first search of product data hosted by the one supplier system to prefetch a result of the list of search terms according to the search schedule, the first search being performed with the one supplier system that generates data to be rendered in a graphical user interface, comprising:
    programmatically simulating, upon receiving product data returned by the one supplier system in response to the search terms, a user interaction with the graphical user interface that triggers generation of additional product data by the one supplier system, and
    retrieving the additional product data that is generated by the one supplier system in response the simulating the user interaction;
storing the result of the first search in a memory coupled with the processor,
    the memory containing results of one or more prior searches of product data hosted by at least one of the plurality of supplier systems;
receiving, after the storing, a search query from a buyer system;
in response to the search query, identifying one or more matches of the search query from at least the result of the first search in the memory without performing another search with a specific supplier system of the plurality of supplier systems that generates data to be rendered in a graphical user interface;
automatically transmitting search data related to the one or more matches in a form of a shopping cart for an order to the buyer system.

* * * * *